(12) United States Patent
Alessio et al.

(10) Patent No.: US 9,384,343 B2
(45) Date of Patent: Jul. 5, 2016

(54) METHODS, DEVICES AND COMPUTER PROGRAM SUPPORTS FOR PASSWORD GENERATION AND VERIFICATION

(75) Inventors: Davide Alessio, Rennes (FR); Marc Eluard, Saint Malo (FR); Yves Maetz, Melesse (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 13/697,135

(22) PCT Filed: May 6, 2011

(86) PCT No.: PCT/EP2011/057345
§ 371 (c)(1),
(2), (4) Date: Nov. 9, 2012

(87) PCT Pub. No.: WO2011/141388
PCT Pub. Date: Nov. 17, 2011

(65) Prior Publication Data
US 2013/0067554 A1    Mar. 14, 2013

(30) Foreign Application Priority Data

May 11, 2010    (EP) .................................. 10305498

(51) Int. Cl.
*G06F 21/46*    (2013.01)
*G06F 3/023*    (2006.01)
*G06F 3/0489*    (2013.01)

(52) U.S. Cl.
CPC ............... *G06F 21/46* (2013.01); *G06F 3/0236* (2013.01); *G06F 3/04895* (2013.01)

(58) Field of Classification Search
CPC ......... G06F 21/31; G06F 21/34; G06F 21/36; H04L 9/32

USPC ................................ 726/2, 7, 9, 27; 713/182
See application file for complete search history.

(56) References Cited

U.S. PATENT DOCUMENTS 4,821,203 A  *  4/1989  Carlton ..................... B31B 1/74
                                                    493/25
6,065,120 A  *  5/2000  Laursen ................... G06F 21/41
                                                    707/999.004

(Continued)

FOREIGN PATENT DOCUMENTS

CN          101604366 A       12/2009
CN          101557406 B   *   4/2012

(Continued)

OTHER PUBLICATIONS

Bryan Sullivan, "Preventing a Brute Force or Dictionary Attack: How to Keep the Brutes Away from Your Loot", Jan. 11, 2007, Retrieved from http://www.codeproject.com/Articles/17111/Preventing-a-Brute-Force-or-Dictionary-Attack-How, 4 pages.*

(Continued)

*Primary Examiner* — Hadi Armouche
*Assistant Examiner* — Shahriar Zarrineh
(74) *Attorney, Agent, or Firm* — Tutunjian & Bitetto, P.C.

(57) ABSTRACT

During log-on of a user to an entity protected by a password, the password is verified by iteratively receiving a password character; and verifying that the received character complies with a predefined property ($\alpha$) that sets at least one requirement for allowable passwords. If this is not the case, then this can indicate a brute force attack and appropriate action may be taken. The property $\alpha$ may be dependent on the user. Also provided are a corresponding device and a computer program product.

7 Claims, 2 Drawing Sheets

(56) References Cited

U.S. PATENT DOCUMENTS

| | | | | |
|---|---|---|---|---|
| 6,148,406 | A * | 11/2000 | Weisz et al. | 726/18 |
| 6,643,784 | B1 * | 11/2003 | McCulligh | H04L 63/083 704/10 |
| 7,386,892 | B2 | 6/2008 | Gilfix et al. | |
| 7,907,542 | B2 * | 3/2011 | Smith | 370/252 |
| 8,020,199 | B2 * | 9/2011 | Smith et al. | 726/7 |
| 8,301,899 | B2 * | 10/2012 | Millar | 713/183 |
| 8,397,077 | B2 * | 3/2013 | Hoey et al. | 713/184 |
| 8,539,567 | B1 * | 9/2013 | Logue | H04L 63/0884 709/223 |
| 8,677,464 | B2 * | 3/2014 | Smith et al. | 726/6 |
| 8,776,214 | B1 * | 7/2014 | Johansson | 726/18 |
| 2004/0059951 | A1 * | 3/2004 | Pinkas et al. | 713/202 |
| 2004/0230843 | A1 * | 11/2004 | Jansen | G06F 21/36 726/7 |
| 2004/0250139 | A1 | 12/2004 | Hurley | |
| 2004/0255155 | A1 | 12/2004 | Stading | |
| 2005/0015614 | A1 | 1/2005 | Gilfix et al. | |
| 2005/0102349 | A1 * | 5/2005 | Rice et al. | 709/201 |
| 2006/0041756 | A1 * | 2/2006 | Ashok et al. | 713/183 |
| 2006/0136737 | A1 * | 6/2006 | Bauchot et al. | 713/183 |
| 2006/0143450 | A1 * | 6/2006 | Airody Udupa | G06F 21/31 713/168 |
| 2006/0277287 | A1 * | 12/2006 | McCall et al. | 709/223 |
| 2007/0101151 | A1 * | 5/2007 | Little | G06F 21/46 713/184 |
| 2007/0282951 | A1 * | 12/2007 | Selimis et al. | 709/205 |
| 2007/0297592 | A1 * | 12/2007 | Pearson | 379/207.02 |
| 2008/0060078 | A1 * | 3/2008 | Lord | 726/26 |
| 2008/0066167 | A1 * | 3/2008 | Andri | G06F 21/46 726/5 |
| 2008/0077985 | A1 * | 3/2008 | Lim | G06F 21/554 726/19 |
| 2008/0216170 | A1 * | 9/2008 | Sanai | G06F 21/46 726/18 |
| 2009/0006856 | A1 | 1/2009 | Abraham et al. | |
| 2009/0158406 | A1 | 6/2009 | Jancula et al. | |
| 2009/0222860 | A1 * | 9/2009 | Huang | 725/58 |
| 2009/0313696 | A1 * | 12/2009 | Himberger et al. | 726/22 |
| 2010/0039220 | A1 * | 2/2010 | Davis | 340/5.52 |
| 2010/0077043 | A1 * | 3/2010 | Ramarao | H04L 12/585 709/206 |
| 2010/0077223 | A1 * | 3/2010 | Maruyama et al. | 713/183 |
| 2010/0184412 | A1 * | 7/2010 | Xiao et al. | 455/414.1 |
| 2010/0314952 | A1 * | 12/2010 | DuBose et al. | 307/126 |
| 2010/0324952 | A1 * | 12/2010 | Bastos et al. | 705/7 |
| 2011/0295753 | A1 * | 12/2011 | Reno | G06Q 20/40 705/72 |
| 2012/0016862 | A1 * | 1/2012 | Rajan | 707/710 |

FOREIGN PATENT DOCUMENTS

| | | |
|---|---|---|
| JP | 2000029838 | 1/2000 |
| JP | 2003006163 | 1/2003 |
| JP | 2006004333 | 1/2006 |
| JP | 2006209175 | 8/2006 |
| JP | 2006209198 | 8/2006 |
| JP | 2009169615 A2 | 7/2009 |

OTHER PUBLICATIONS

Aladdin Knowledge Systems Ltd: "eToken Reference Guide" Internet Citation, Aug. 2003.
Search Report dated Aug. 26, 2011.
"John the Ripper password cracker," Openwall bringing security into open environments. Feb. 2015. pp. 1-3. http://www.openwall.com/john/.

* cited by examiner

METHODS, DEVICES AND COMPUTER PROGRAM SUPPORTS FOR PASSWORD GENERATION AND VERIFICATION

TECHNICAL FIELD

The present invention relates generally to computer systems and in particular to the treatment of passwords at log-on in such systems.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Passwords are ubiquitous in today's computer systems, for example to authenticate a user for log-on. In its generic definition, a password is constituted of a succession of symbols taken within a predefined alphabet (for example: 4 numerical values for PIN code).

In order to create 'strong' passwords, it is common to require that a chosen password complies with a predefined policy. Such a policy may for example be that the password should be at least eight characters long and that it should comprise at least one upper-case letter and at least one special character such as &, (and =. US 2004/250139 and US 2009/158406 present solutions for selecting such passwords.

However, even password protected systems using strong passwords can be attacked either by brute force attacks (iteratively trying every possible value) or by dictionary attacks (trying a subset of preferred values). Hereinafter, these attacks will be called "automated attacks". In order to simplify their implementation, these attacks operate using low-level layers and not the authentication system's user interface. Some of these tools are even available on the Internet, for example the John the Ripper password cracker.

Current authentication systems are incapable of differentiating between automated attacks and user mistakes. By default, some authentication systems implement mechanisms to minimize the risk of automated attacks, either by inserting delays between two successive requests, by limiting the number of unsuccessful tries, or by a combination of the two. In the example of PIN codes, the number of unsuccessful tries is very often fixed to three.

It can therefore be appreciated that there is a need for a solution that can allow an authentication system to detect an automated attack, thereby allowing the system to react to such attacks according to appropriate policies. The present invention provides such a solution.

SUMMARY OF INVENTION

In a first aspect, the invention is directed to a method of verification of an input password during log-on of a user to an entity protected by a password. A processor receives at least one character of the input password; and verifies that the at least one received character complies with a predefined property that sets at least one requirement for allowable passwords.

In a first preferred embodiment, all the characters of the input password and an indication that the input password is complete are received and the processor further verifies that the completed input password corresponds to the password that protects the entity. In a variant, the completed input password comprises a first part and a second part, the property being expressed by the second part and compliance with the property is verified by processing the first part to see if the processed first part matches the second part.

In a second preferred embodiment, the property is dependent on the user.

In a third preferred embodiment, the processor determines that a brute force attack has been attempted upon detection of a predetermined number of input passwords or parts of input passwords that do not respect the property for the user. It is advantageous to take appropriate action upon determination that a brute force attack has been attempted. Such appropriate action comprises at least one of issuing a warning to an administrator, issuing a warning to the user, blocking the system and waiting a predetermined time before accepting further log-on attempts.

In a second aspect, the invention is directed to a device for verifying an input password during log-on of a user to an entity protected by a password. The device comprises an interface for receiving password characters; and a processor for verifying that at least one received password character complies with a predefined property that sets at least one requirement for allowable passwords.

In a first preferred embodiment, the interface is further for receiving an indication that the input password is complete and wherein the processor is further for verifying that the completed input password corresponds to the password that protects the entity. In a variant, the completed input password comprises a first part and a second part, wherein the property is expressed by the second part, and the processor is adapted to verify compliance with the property by processing the first part to see if the processed first part matches the second part.

In a second preferred embodiment, the property is dependent on a user of the password.

In a third preferred embodiment, the processor is further for determining that a brute force attack has been attempted upon detection of a predetermined number of input passwords or parts of input passwords that do not respect the property for the user. It is advantageous to take appropriate action upon determination that a brute force attack has been attempted. Such appropriate action comprises at least one of issuing a warning to an administrator, issuing a warning to the user, blocking the system and waiting a predetermined time before accepting further log-on attempts.

In a third aspect, the invention is directed to a computer program product storing instructions of a software program that, when executed by a processor during log-on of a user to an entity protected by a password, receives at least one character of an input password; and verifies that the at least one received character complies with a predefined property that sets at least one requirement for allowable passwords.

BRIEF DESCRIPTION OF DRAWINGS

Preferred features of the present invention will now be described, by way of non-limiting example, with reference to the accompanying drawings, in which.

DESCRIPTION OF EMBODIMENTS

Figure 1:
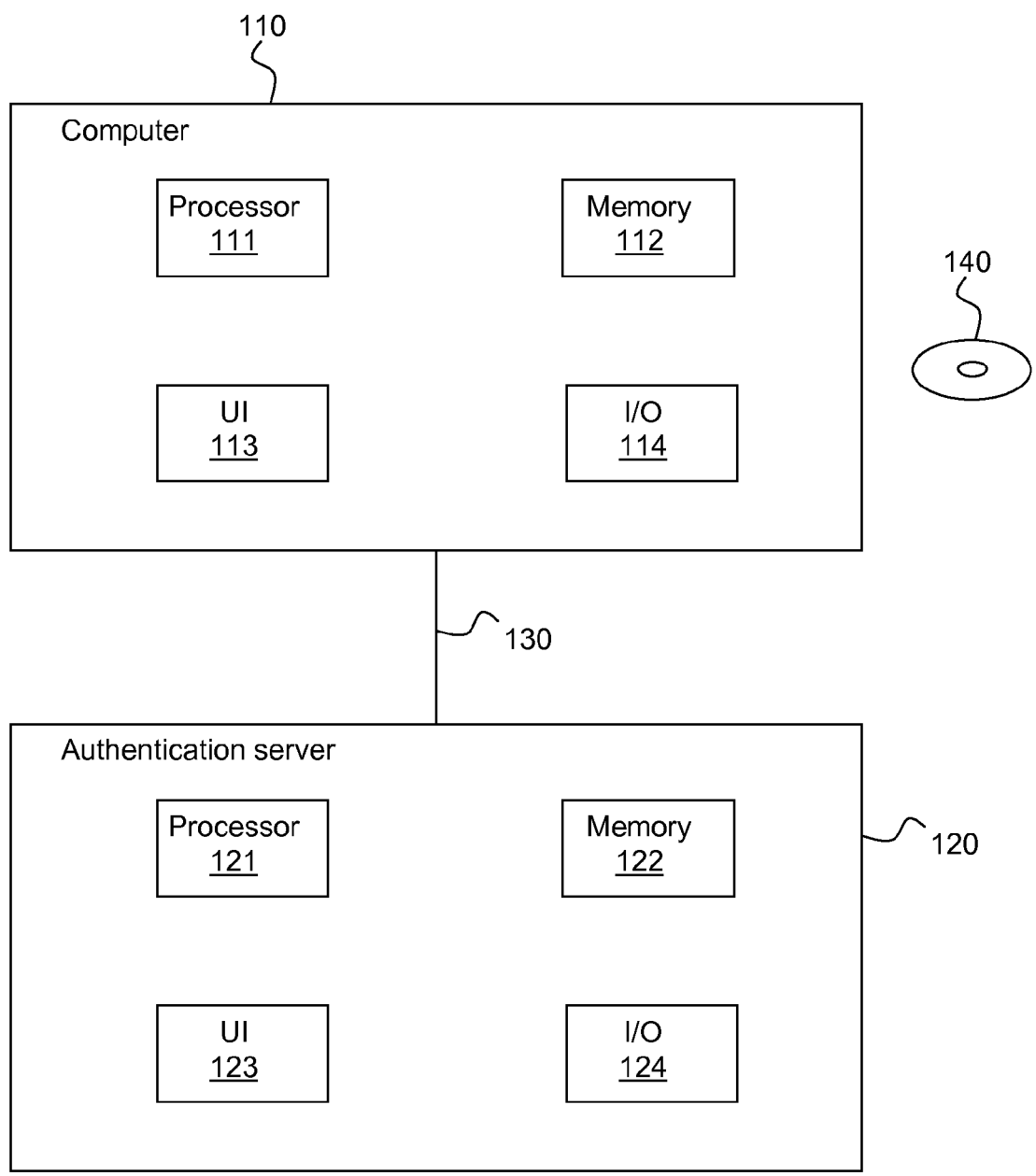
FIG. 1 illustrates an exemplary system in which the invention may be implemented.

FIG. 1 illustrates an exemplary system in which the invention may be implemented. The system comprises a computing device ("computer") 110 and an authentication server 120; it will be appreciated that the invention may be implemented on the computer 110, the authentication server 120, or both the computer 110 and the authentication server 120. The computer 110 and the authentication server 120 can be any kind of suitable computer or device capable of performing calculations, such as a standard Personal Computer (PC) or workstation. The computer 110 and the authentication server 120 each preferably comprise at least one processor 111, 121, RAM memory 112, 122, a user interface 113, 123 for interacting with a user, and a second interface 114, 124 for interaction with other devices over connection 130. The computer 110 and the authentication device 120 each also preferably comprise an interface for reading a software program from a digital data support 140 that stores instructions that, when executed by a processor, performs any of the password methods described hereinafter. The skilled person will appreciate that the illustrated devices are very simplified for reasons of clarity and that real devices in addition would comprise features such as persistent storage devices.

A main idea is to add a property $\alpha$ (also called 'rule' or 'function') to the set of passwords $\Omega$. This will split the complete password space into two distinct subsets:

the subset of valid passwords (i.e. the valid password space) which respect the property $$\Omega_v = \{\omega \in \Omega | \alpha(\omega)\}$$

the subset of invalid password which do not respect the property $$\Omega_i = \{\epsilon \Omega | \neg \alpha(\omega)\}$$

It will be appreciated that this is already the case in some prior art systems that, for example, require a password to comprise at least eight characters including one upper-case letter and one character other than a letter or a number. However, it is important to realise that this requirement is only intended to diversify the users' passwords so as to make them less susceptible to dictionary attacks; in no way does it allow detection of automated attacks and it does nothing to guide the user to valid passwords by proposing allowable characters.

It will be appreciated that the subsets advantageously are dynamic and that they thus may change over time. One exemplary implantation of this dynamism is to put the n most recently used passwords in the invalid subset $\Omega_i$.

While the subsets are distinct, the rules that define them may for ease of implementation overlap, in which case one rule should take precedence over the other. For example, a rule that forbids the use of the year of birth of a user advantageously overrules any rules that would otherwise allow that specific combination.

When the user enters the password through the user interface, he is limited to the valid password space $\Omega_v$. The system considers any request from the invalid password space $\Omega_i$ (and possibly also the third subset) as an attack and can react accordingly.

The choice of the property $\alpha$ is a trade-off between password entropy (size of $\Omega_v$) and detectability of an attack (size of $\Omega_i$).

Thus, the use of the property a allows detection of brute force attacks. If an attacker systematically tries all password values, this will necessarily include the elements of $\Omega_i$. In addition, dictionary attacks may be countered by adding known or likely dictionary elements to $\Omega_i$.

The property $\alpha$ can be a complex function. It can apply to the complete password but should preferably be ensured for each symbol entry by the user interface. In this case, the symbols that can be entered at a given step depend on previously entered symbols.

Preferably, the property $\alpha$ partitions the password space in two sections that are "well mixed" and of a non-negligible size, in order to ensure that a random password guessing has a non-negligible probability of using a password from the invalid subset.

For example, for a textual password entry the property $\alpha$ could be to alternate between uppercase and lowercase letters. In this case, for the first symbol any character (uppercase or lowercase) can be chosen during password creation. Then, the user interface proposes the set of lowercase characters if the previous one was uppercase and vice versa. The property $\alpha$ is therefore verified at each step of the creation of the password.

If, for instance, the ratio r between the valid password space $\Omega_v$ and the invalid password space $\Omega_i$ is very low ($r \ll 1$), then it is difficult to come up with valid passwords and the system may also be vulnerable to attacks from hackers with some knowledge of the rules. On the other hand, if $r \gg 1$, then almost all passwords are valid and the likelihood of detecting an attack is low. It would thus appear that a ratio $r \approx 1$, perhaps $0.5 < r < 2$, is a good compromise that may be used as a rule of thumb.

The property a may depend on various elements, like for example the user name. In this case, two users can have different rules to construct their passwords. For example, if the number of characters of the username is odd (respectively even), then the password should contain only uppercase (respectively lowercase) characters. Any request composed of mixed uppercase and lowercase characters will be considered as an attack. Another example is to require the sum of the number of characters of the user name and the password to be even (or odd).

The definition of the property a can be very complex, taking into account many parameters. However, a too complex property can have the following drawbacks: resulting passwords may be difficult to remember, and the size of valid password set $\Omega_v$ may become too small to ensure sufficient entropy.

The overall level of security of the system depends on the secrecy of the property $\alpha$. Knowing or guessing this property would allow to build the set of the valid password values ($\Omega_v$) and perform a dictionary attack with this set, without being detected.

To make it more difficult for an attacker to reconstruct the valid subset $\Omega_v$, it is advantageous not to actively highlight constraints in the user interface at the login moment, but to do so only during password construction.

Furthermore, the classical countermeasures used in authentication systems (e.g. maximum number of tries and imposed delay between incorrect password entries) can still be used in combination with the solution of the present invention.

Illustrative Example

This section illustrates the inventive idea through a study case of a PIN code. The example also highlights the generalization of traditional countermeasures, for example avoiding dictionary attacks.

Consider a PIN code: a series of 4 digits chosen in $\{0, \ldots, 9\}$.

In the generic, prior art case without any condition in password generation, the password space $\Omega$ is represented by all (decimal) numbers between "0000" and "9999", $\Omega = \{p_1 p_2 p_3 p_4 | p_i \in (0, \ldots, 9)\}$.

Hereinafter, a PIN code is denoted ID, with $p=p_1p_2p_3p_4$ where $p_i \in \{0, \ldots, 9\}$.

For the generic case:

$$\alpha: \begin{cases} \Omega_v = \Omega \\ \Omega_i = \phi \end{cases}$$

A first step can be to exclude a particular set, "the dictionary", of combinations that are used too often or that are too simple, for example the same digit repeated 4 times (e.g. "7777") or where the 4 digits are in an increasing sequence (e.g. "1234"). The system thus implemented will verify during password generation that the chosen PIN code is not part of the dictionary and, if this is the case, validates the chosen PIN code. During login (or other kinds of authentication), if a PIN code from the invalid subset $\Omega_i$ is entered, the system raises an exception and takes the planned countermeasures.

In symbols:

$$\alpha': \begin{cases} \Omega_v = \Omega \backslash \Omega_i \\ \Omega_i = \{p \mid p_1 = p_2 = p_3 = p_4 \text{ or } p_{i+1} = p_i + 1\}. \end{cases}$$

The second step can be to integrate a function $\alpha$ to partition the password space $\Omega$ into a valid subset and an invalid subset (of which the latter will be combined with the "dictionary"). For example, the function $\alpha$ may state that the parity of every digit has to change with respect to the previous one. The system, optionally, enforces the observation of this rule during the generation phase by modifying its interface and, optionally, showing only valid digits. During password authentication, the system checks that the entered PIN respects the rule $\alpha$; if it doesn't, then an exception is raised and the system takes the planned countermeasures.

Once again, In symbols:

$$\alpha'': \begin{cases} \Omega_v = \{p \in \Omega \mid p_{j+1} \text{ and } p_j \text{ have different parity, } j = 1, \ldots, 4\} \backslash \Omega_i \\ \Omega_i = \{p \mid p_1 = p_2 = p_3 = p_4 \text{ or } p_{j+1} = p_j + 1, j = 1, \ldots, 4\} \end{cases}$$

In this example, the function $\alpha''$ allows some combinations that are forbidden by the dictionary condition.

Then, the third step is to enforce, at password generation, the active condition via the interface or simply refusing an invalid PIN code. During password authentication, the system proceeds as in step two and three verifying both conditions and otherwise raising an exception.

It may easily be verified that the variability of valid PIN codes decreases from $\alpha$ to $\alpha''$, but still maintaining a size useful for the choice of the PIN code. It may also be observed that allowed and forbidden PIN code sets are of non-negligible size and are "well mixed". This latter property depends also on the tools used to attack the system and not only on the particular $\alpha$ function used.

Optionally, as already mentioned it is possible to add variability to the function $\alpha$ depending on the user name.

In this PIN example, it is required that the parity of the first digit of the PIN code is different from the parity of the length of the user name. Then login denotes the user name entered by the user, and #{login} denotes its length; further, $p_0$ denotes the parity of #{login}.

Including this condition in $\alpha$ in symbols gives:

$$\alpha''': \begin{cases} \Omega_v = \{p \in \Omega \mid p_{j+1} \text{ and } p_j \text{ have different parity, } j = 0, \ldots, 4\} \backslash \Omega_i \\ \Omega_i = \{p \mid p_1 = p_2 = p_3 = p_4 \text{ or } p_{j+1} = p_j + 1\} \end{cases}$$

Figure 2:
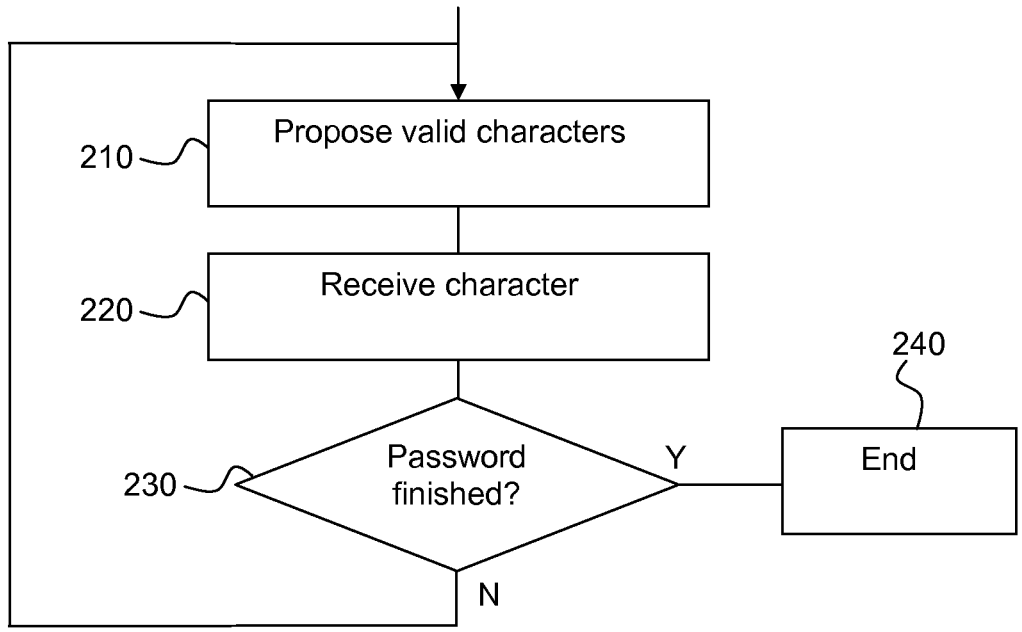
FIG. 2 illustrates a method of password generation according to a preferred embodiment of the present invention.

FIG. 2 illustrates a method for password generation according to a preferred embodiment of the present invention. The method may be implemented on the computer 110 or on the authentication server 120 interacting with the computer 110.

First, the system may propose possible characters, i.e. characters that comply with the property $\alpha$, for the next user input, step 210. In particular for the first character, this step may be skipped, provided that the choice is free. It will be appreciated that the step may be substituted by a step that verifies that the input character complies with the property $\alpha$ and refuses to accept the character if this is not the case.

Then a character is received from the user, step 220, and it is verified if the password is complete, step 230. This may be indicated by user input (such as if the user clicks on an icon or presses 'Return'), but it may also be implicit. If the password is complete, then the method ends in step 240; if not, the method returns to step 210.

Figure 3:
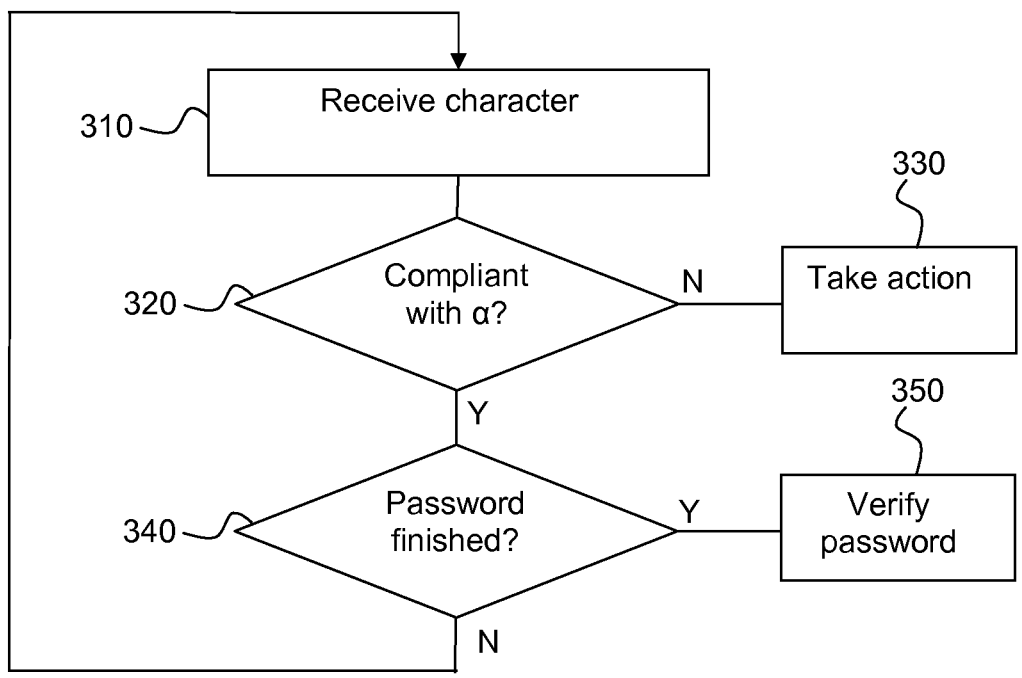
FIG. 3 illustrates a method of password verification according to a preferred embodiment of the present invention.

FIG. 3 illustrates a method of password verification according to a preferred embodiment of the present invention. The password verification method is advantageously performed when a user logs on to an entity (an account, a device, a server etc.) protected by the password to be verified. As with the password generation method, the verification method may be implemented by the computer 110 or the authentication server 120. A character is received, step 310, and it is verified, step 320, if the character complies with the property $\alpha$. If this is not the case, then it may be determined that a brute force attack has been attempted and appropriate action may be taken in step 330. Appropriate action may for example be issuing a warning to an administrator and/or the user, blocking the system after the input of X non-compliant passwords, and the use of a delay before accepting a further attempt. It will be appreciated that it is possible to keep the appropriate action on hold until the entire password has been input, in which case the method continues with step 340. Appropriate action may also be deferred until a certain number of incorrect passwords (i.e. passwords that do not respect the property $\alpha$) have been entered; the number of incorrect passwords may consider the time, e.g. X number of incorrect passwords in the last Y seconds.

In step 340, it is verified if the password is complete, which is done in a manner similar to step 230 of the generation method. If this is not the case, then the method waits for the reception of the next character in step 210; however, if this is the case, then the input password is verified, step 350, although this may not be necessary if the property $\alpha$ is not respected, as such a password cannot be correct. In other words, it is verified that the input password corresponds to the password that protects the entity. As mentioned, the appropriate action may be taken at this point, as well as earlier. It should also be noted that compliancy with the property $\alpha$ may be postponed until this step (i.e. step 320 does not occur until step 350, either before verification of the password or after unsuccessful verification of the password).

Alternative Embodiment

A different way to express the property $\alpha$ is to attach at the end of the password, integrally chosen by the user, one or more characters chosen by the server as "authenticating padding". It is preferable that the characters are the result of a pseudo-random function taking as parameters the password entered by the user, his login and a server side secret parameter. The drawback of this solution is that the user is obliged to learn few more characters added to his password.

As an example of this latter method is a HMAC (Hash-based Message Authentication Code) based solution: during the generation phase user enters his password, the system computes an HMAC of it and returns the "complete" password composed by chaining the password entered by the user and the first n bits of the HMAC. During the authentication phase, the user enters the password, whereupon the system checks if it is a possible password, verifying that the last n bits correspond with the HMAC value.

It will be appreciated that the present invention can provide a way of verifying passwords that:
- is resistant to brute force and dictionary attacks,
- enables the system to discriminate if it is under attack,
- is compatible with existing password-based authentication systems,
- is scalable (can be used on long passwords with large alphabets), and
- wherein the property a can adapt to different environments (PIN code, textual passwords, graphical passwords).

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method of verification of an entered password during log-on of a user to an entity protected by a password, the password comprising several characters, and the method comprising in a processor:
   receiving at least one character of the password;
   verifying that the at least one received character has a parity value different from a parity of the length of the user name;
   determining that a brute force attack has been attempted upon detection of a predetermined number of parts of entered passwords having parity values equal to the parity of the length of the user name; and
   upon reception of all the characters of the entered password and an indication that the password is complete, the subsequent step of verifying that the complete password corresponds to the password that protects the entity.

2. The method of claim 1, further comprising taking appropriate action upon determination that a brute force attack has been attempted.

3. The method of claim 2, wherein appropriate action comprises at least one of issuing a warning to an administrator, issuing a warning to the user, blocking the system and waiting a predetermined time before accepting further log-on attempts.

4. A device for verifying an entered password during log-on of a user to an entity protected by a password, the password comprising several characters, and the device comprising:
   an interface for receiving at least one character of said entered password; and
   a processor configured to:
      verify that at least one received password character has a parity value different from a parity of the length of a user name;
      determine that a brute force attack has been attempted upon detection of a predetermined number of parts of entered passwords having parity values equal to the parity of the length of the user name and
      upon reception of all the characters of the password and an indication that the entered password is complete, subsequently verify that the complete entered password corresponds to the password that protects the entity.

5. The device of claim 4, wherein the processor is further configured to take appropriate action upon determination that a brute force attack has been attempted.

6. The device of claim 5, wherein appropriate action comprises at least one of issuing a warning to an administrator, issuing a warning to the user, blocking the system and waiting a predetermined time before accepting further log-on attempts.

7. A computer program product stored on a non-transitory computer readable medium, and having stored thereon instructions of a software program, wherein the instructions, when executed by a processor performs, during log-on of a user to an entity protected by a password comprising several characters:
   receiving at least one character of an entered password; and
   verifying that the at least one received character has a parity value different from a parity of a length of the user name;
   determining that a brute force attack has been attempted upon detection of a predetermined number of parts of entered passwords having parity values equal to the parity of the length of the user name; and
   upon reception of all the characters of the entered password and an indication that the entered password is complete, subsequently verifying that the complete password corresponds to the entered password that protects the entity.

* * * * *